(12) United States Patent
Lambert et al.

(10) Patent No.: US 11,493,082 B2
(45) Date of Patent: Nov. 8, 2022

(54) BIMINI TOP HINGE

(71) Applicant: Protomet Corporation, Oak Ridge, TN (US)

(72) Inventors: Dale Lee Lambert, Oak Ridge, TN (US); William Matthew Reid, Knoxville, TN (US)

(*) Notice: Subject to any disclaimer, the term of this patent is extended or adjusted under 35 U.S.C. 154(b) by 301 days.

(21) Appl. No.: 16/887,826

(22) Filed: May 29, 2020

(65) Prior Publication Data

US 2020/0378435 A1  Dec. 3, 2020

Related U.S. Application Data

(60) Provisional application No. 62/855,016, filed on May 31, 2019.

(51) Int. Cl.
*F16C 11/10* (2006.01)
*B63B 17/02* (2006.01)

(52) U.S. Cl.
CPC ............ *F16C 11/10* (2013.01); *B63B 17/02* (2013.01)

(58) Field of Classification Search
CPC ......... B63B 17/00; B63B 17/02; F16C 11/00; F16C 11/10
USPC ........................................................ 114/361
See application file for complete search history.

(56) References Cited

U.S. PATENT DOCUMENTS

| | | |
|---|---|---|
| 2,823,684 A | 2/1958 | Sartori |
| 3,001,212 A | 9/1961 | Towne |
| 4,230,414 A * | 10/1980 | Cheshire ............... A47C 1/03 297/411.32 |
| 4,286,353 A | 9/1981 | Roche |
| 4,593,641 A | 6/1986 | Adams et al. |
| 4,683,900 A | 8/1987 | Carmichael |
| 4,926,782 A | 5/1990 | Lacy |
| 5,240,020 A | 8/1993 | Byers |
| 5,681,045 A | 10/1997 | Liao |
| 5,803,104 A | 9/1998 | Pollen |
| 5,918,613 A | 7/1999 | Larson |
| 5,984,416 A * | 11/1999 | Waldo ................... A47C 1/03 297/411.32 |
| 6,142,438 A | 11/2000 | Cooper et al. |
| 6,257,261 B1 | 7/2001 | Johnson |
| 6,349,666 B1 | 2/2002 | Hastings |
| 6,439,150 B1 | 8/2002 | Murphy et al. |
| 6,478,500 B1 | 11/2002 | Farenholtz |
| 6,711,783 B2 | 3/2004 | LeMole |
| 6,799,529 B1 | 10/2004 | Willis |
| 6,820,569 B2 | 11/2004 | Warfel et al. |
| 6,907,642 B1 | 6/2005 | Czipri |
| 6,928,766 B1 | 8/2005 | Goebel et al. |
| 6,945,188 B2 | 9/2005 | Eck et al. |

(Continued)

*Primary Examiner* — Lars A Olson
(74) *Attorney, Agent, or Firm* — Robinson IP Law, PLLC

(57) ABSTRACT

A hinge assembly includes: a body; a first arm pivotally mounted on the body and movable between a first position and a second position, the first arm including a plurality of teeth formed thereon; a pawl mounted on the body proximate to a portion of the first arm, the pawl shaped to releasably engage the plurality of teeth of the first arm. In a collapsed position of the hinge assembly the pawl is disengaged from the plurality of teeth of the first arm such that the first arm is pivotable relative to the pawl. In a deployed position the pawl engages the plurality of teeth of the first arm to releasably secure the first arm in the second position.

19 Claims, 7 Drawing Sheets

(56) References Cited

U.S. PATENT DOCUMENTS

| | | |
|---|---|---|
| 7,040,587 B2 | 5/2006 | Thompson et al. |
| 7,401,569 B2 | 7/2008 | Jones |
| 7,418,918 B2 | 9/2008 | Bierbower et al. |
| 7,438,015 B1 * | 10/2008 | Schwindaman ........ B63B 17/02 114/361 |
| 7,571,691 B2 | 8/2009 | Russikoff |
| 7,685,960 B1 | 3/2010 | Carusello et al. |
| 7,895,964 B2 | 3/2011 | Russikoff |
| 7,950,342 B2 | 5/2011 | Russikoff |
| 8,297,484 B2 | 10/2012 | Jesewitz et al. |
| 8,752,498 B1 * | 6/2014 | Schwindaman ........ B63B 17/02 114/361 |
| 9,096,291 B2 | 8/2015 | Perosino et al. |
| 9,365,264 B2 | 6/2016 | Perosino et al. |
| 9,752,364 B2 | 9/2017 | James |
| 9,855,998 B2 | 1/2018 | Perosino et al. |
| 10,597,119 B1 | 3/2020 | Lambert et al. |
| 2008/0022916 A1 | 1/2008 | Borges et al. |
| 2016/0368570 A1 | 12/2016 | Perosino et al. |

* cited by examiner

BIMINI TOP HINGE

CROSS-REFERENCE TO RELATED APPLICATION

This application claims priority to and is a non-provisional of U.S. Patent Application Ser. No. 62/855,016 for a "Bimini Top Hinge" filed on May 31, 2019, the contents of which are incorporated herein by reference in its entirety.

FIELD

This disclosure relates to the field of shade covers for watercraft. More particularly, this disclosure relates to a bimini top hinge that allows for movement of a bimini top between folded and deployed positions.

BACKGROUND

Bimini tops are frequently installed on boats and other watercraft to provide shade to passengers of the watercraft. A traditional bimini top includes a canvas cover that is supported by a frame above passengers of the watercraft. These bimini tops are typically collapsible such that the bimini top is stowed when shade or shelter is not needed or during storage of the watercraft. While some bimini tops are foldable or otherwise collapsible when the top is not in use, collapsing or storing these tops is typically time consuming, difficult, and cumbersome, often times requiring assistance from more than one user to complete the process of collapsing the bimini top. For example, one user may be required to hold the bimini an open position while another user attempts to secure the bimini top in the open position.

It can also be difficult to deploy a bimini top such that a material covering a frame of the bimini top is tightly stretched and to subsequently release the bimini top for folding when the bimini material is tightly stretched. For example, deployment of a bimini top may typically require that the bimini be held in a tightly opened position while a pin or other locking mechanism is secured to hold the bimini in a tightly opened position. This frequently requires difficult manipulation of the locking mechanism and bimini top by an individual user or multiple users to move the bimini top into position. Some existing bimini tops are not capable of being securely deployed such that a canvas portion of the bimini is tightly held open, thereby causing the bimini top to move or flap during operation of the watercraft. In some instances, a bimini top may stretch or become worn over time, and existing mechanisms for deploying a bimini top may not allow for additional tightening of the bimini top.

What is needed, therefore, is a folding bimini top hinge that allows for ready deployment and folding of the bimini top.

SUMMARY

The above and other needs are met by a hinge assembly for a bimini top for securing a bimini top is deployed and stowed positions. In a first aspect, a hinge assembly includes: a body; a first arm pivotally mounted on the body and movable between a first position and a second position, the first arm including a plurality of teeth formed thereon; a pawl mounted on the body proximate to a portion of the first arm, the pawl shaped to releasably engage the plurality of teeth of the first arm. In a collapsed position of the hinge assembly the pawl is disengaged from the plurality of teeth of the first arm such that the first arm is pivotable relative to the pawl. In a deployed position the pawl engages the plurality of teeth of the first arm to releasably secure the first arm in the second position.

In one embodiment, the hinge assembly further includes a second arm pivotally mounted on the body and movable between a first position and a second position. In another embodiment, the second arm further including an aperture formed therethrough. When the second arm is in the second position the aperture is in alignment with apertures formed through the body. In yet another embodiment, the hinge assembly further includes a second arm locking pin insertable through the housing and the aperture of the second arm to secure the second arm in the second position.

In one embodiment, the hinge assembly further includes a bimini frame mounted on the hinge assembly and movable between deployed and collapsed positions on the hinge assembly.

In another embodiment, the pawl further includes a pawl spring located between the pawl and the body for biasing the pawl towards the first arm. In yet another embodiment, the pawl further includes a pawl button. A user disengages the pawl from the first arm by manipulating the pawl button.

In one embodiment, the hinge assembly further includes a pawl lock movably mounted on the housing proximate to the pawl, wherein the pawl lock secures the pawl in a disengaged position relative to the first arm. In yet another embodiment, the hinge assembly includes a pawl lock spring for biasing the pawl lock towards the pawl for securing the pawl in the disengaged position.

In a second aspect, a bimini top hinge assembly for supporting a bimini top in deployed and collapsed positions includes: a body; a first bimini arm pivotally mounted on the body and movable between a first position and a second position, the first arm including a plurality of teeth formed thereon; a second bimini arm pivotally mounted on the body and movable between a first position and a second position; a pawl pivotally mounted on the body proximate to a portion of the first arm, the pawl shaped to releasably engage the plurality of teeth of the first arm. In a collapsed position of the hinge assembly the pawl is disengaged from the plurality of teeth of the first arm such that the first arm is pivotable relative to the pawl. In a deployed position the pawl engages the plurality of teeth of the first arm to releasably secure the first arm in the second position.

In one embodiment, the second arm further including an aperture formed therethrough, wherein when the second arm is in the second position the aperture is in alignment with apertures formed through the body. In another embodiment, the hinge assembly further includes a second arm locking pin insertable through the housing and the aperture of the second arm to secure the second arm in the second position.

In yet another embodiment, the hinge assembly further includes a bimini frame mounted on the hinge assembly and movable between deployed and collapsed positions on the hinge assembly.

In one embodiment, the pawl further includes a pawl spring located between the pawl and the body for biasing the pawl towards the first arm. In another embodiment, the pawl further includes a pawl button, wherein a user disengages the pawl from the first arm by manipulating the pawl button. In yet another embodiment, the hinge assembly further includes a pawl lock movably mounted on the housing proximate to the pawl, wherein the pawl lock secures the pawl in a disengaged position relative to the first arm. In one embodiment, the hinge assembly includes a pawl lock spring for biasing the pawl lock towards the pawl for securing the pawl in the disengaged position.

In a third aspect, a bimini top hinge assembly for supporting a bimini top in deployed and collapsed positions includes: a body; a first bimini arm pivotally mounted on the body and movable between a first position and a second position, the first arm including a plurality of teeth formed thereon; a second bimini arm pivotally mounted on the body and movable between a first position and a second position; a pawl pivotally mounted on the body proximate to a portion of the first arm, the pawl shaped to releasably engage the plurality of teeth of the first arm; a pawl lock movably mounted on the housing proximate to the pawl, wherein the pawl lock secures the pawl in a disengaged position relative to the first arm. In a collapsed position of the hinge assembly the pawl is disengaged from the plurality of teeth of the first arm such that the first arm is pivotable relative to the pawl. In a deployed position the pawl engages the plurality of teeth of the first arm to releasably secure the first arm in the second position.

In one embodiment, the hinge assembly further includes a pawl lock spring for biasing the pawl lock towards the pawl for securing the pawl in the disengaged position. In another embodiment, the hinge assembly further includes a bimini frame mounted on the hinge assembly and movable between deployed and collapsed positions on the hinge assembly.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
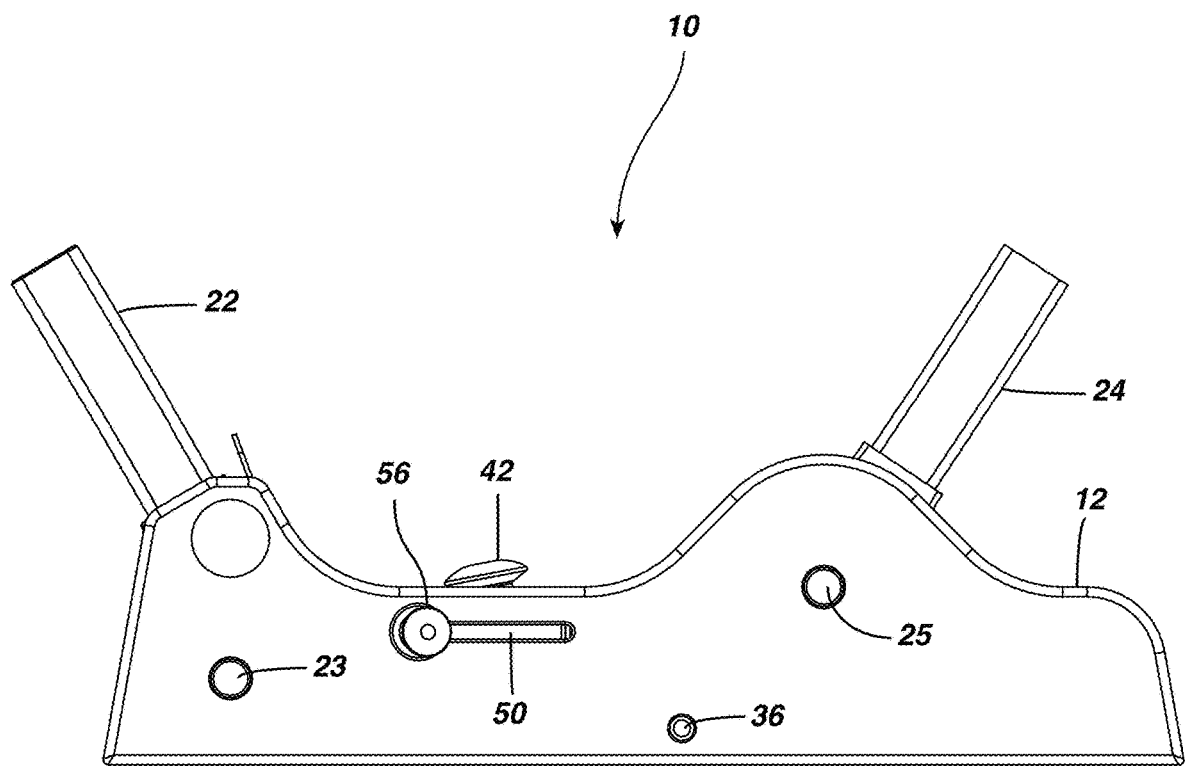
FIG. 1 is a side view of a hinge assembly according to one embodiment of the present disclosure.

FIG. 1 shows a basic embodiment of a hinge assembly 10 for supporting a bimini frame on a vehicle and preferably on a watercraft. The hinge assembly 10 is preferably mounted on a surface, such as a gunwale or other like surface of a watercraft and supports a bimini frame and top above the watercraft to provide shade to passengers of the watercraft. The hinge assembly 10 advantageously secures a bimini top in a deployed position and allows a user to readily fold the bimini top into a collapsed position.

Figure 3:
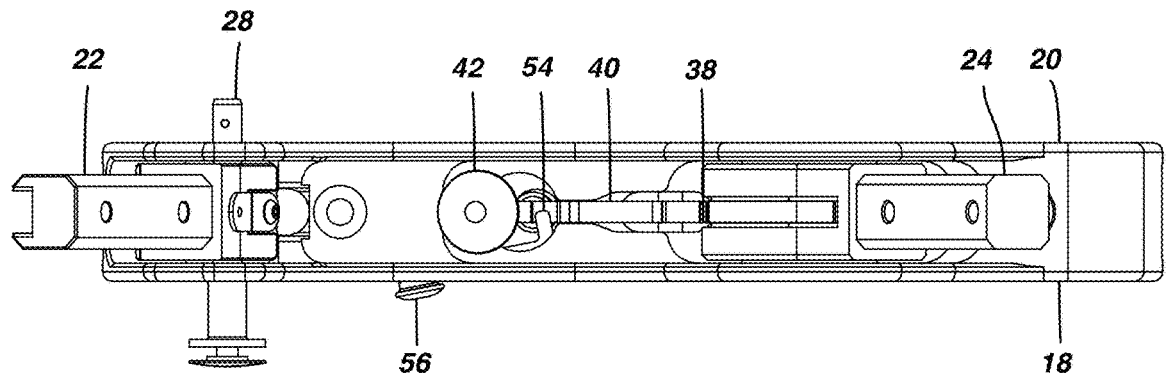
FIG. 3 shows a top view of a hinge assembly according to one embodiment of the present disclosure.
Figure 4:
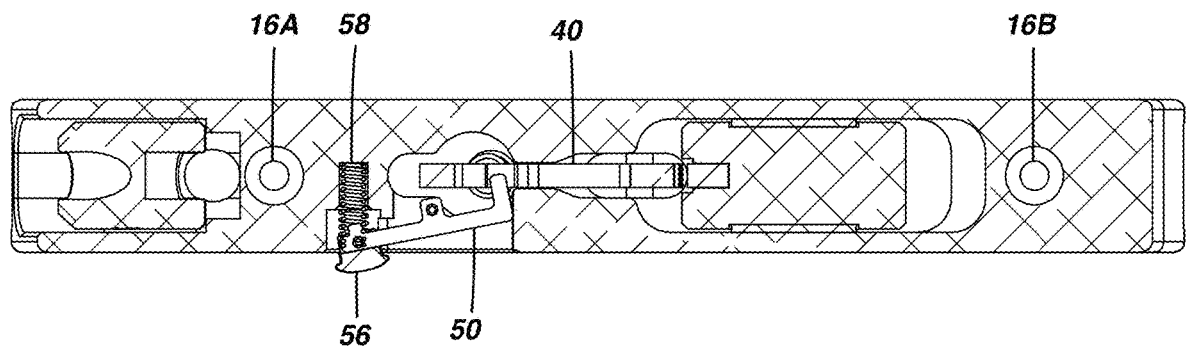
FIG. 4 shows a cross-sectional top view of a hinge assembly according to one embodiment of the present disclosure.
Figure 5:
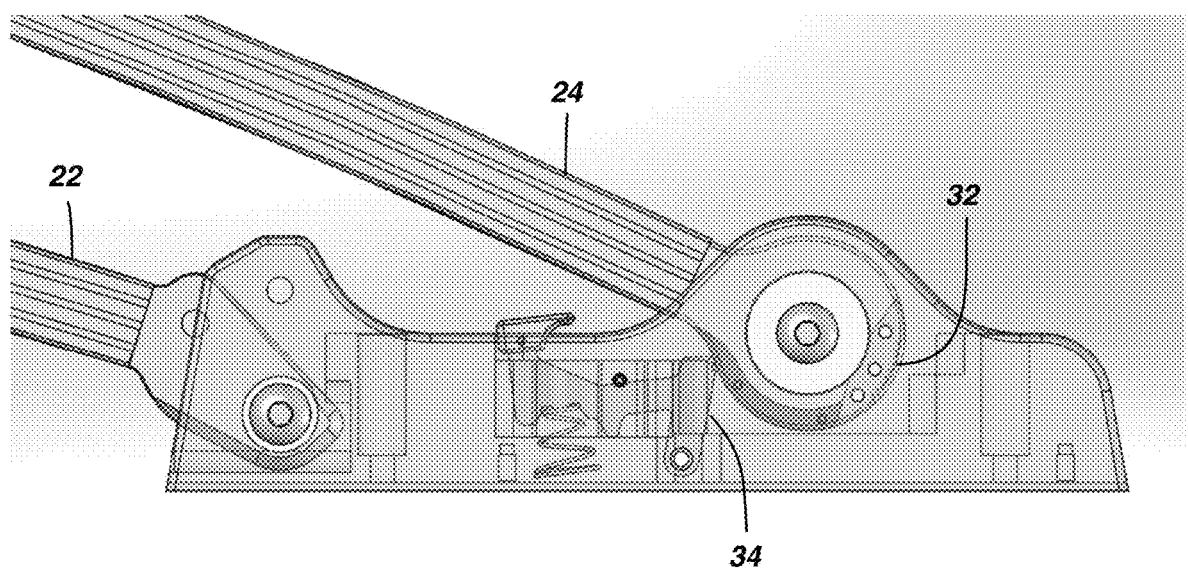
FIG. 5 shows a cross-sectional side view of a hinge assembly in a collapsed position according to one embodiment of the present disclosure.
Figure 6:
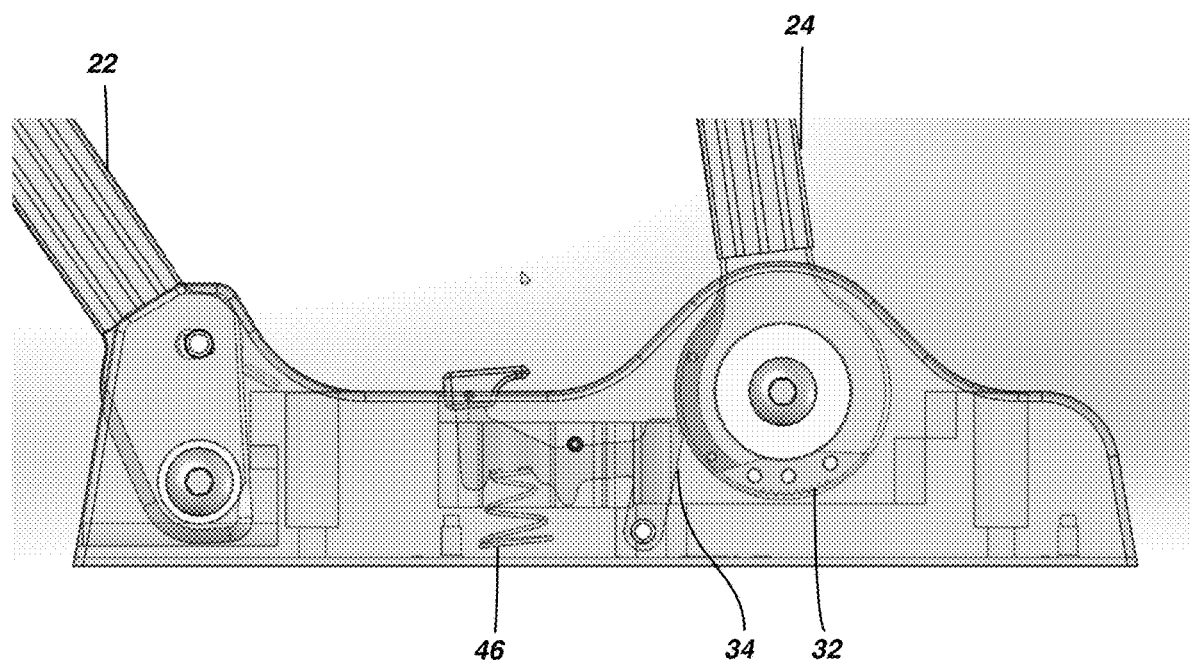
FIG. 6 shows a cross-sectional side view of a hinge assembly moving between a collapsed and deployed position according to one embodiment of the present disclosure.
Figure 7:
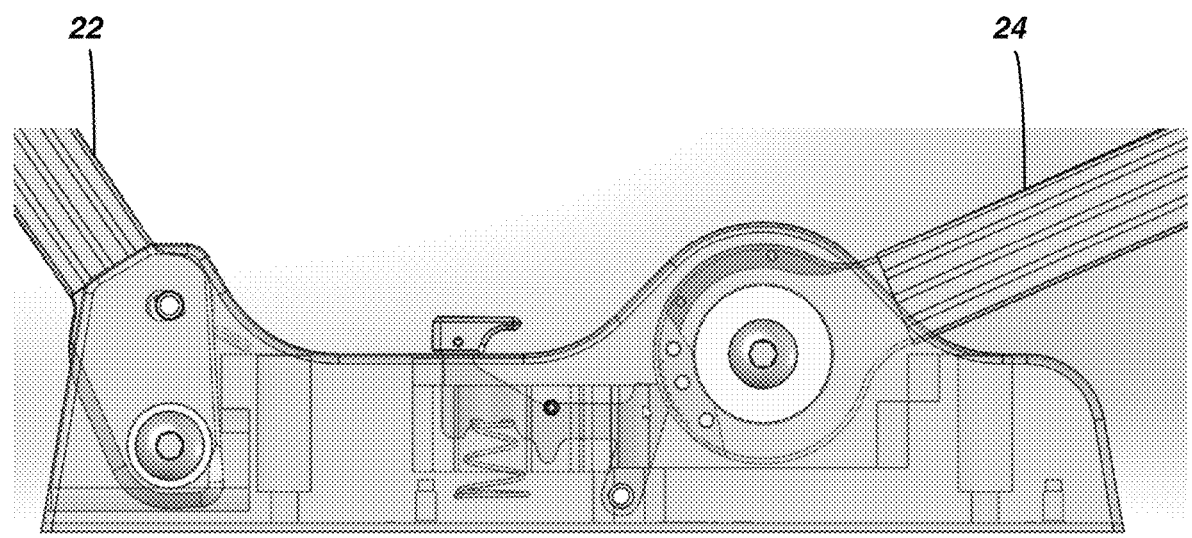
FIG. 7 shows a cross-sectional side view of a hinge assembly in a deployed position according to one embodiment of the present disclosure.

The hinge assembly 10 includes a body 12 on which components of the hinge assembly 10 may be mounted. The body 12 is preferably elongate in shape, as shown in FIG. 3, and includes a base plate 14 formed along a bottom of the body 12. The base plate 14 preferably includes one or more apertures 16A and 16B formed therethrough for receiving one or more fasteners to secure the body 12 to a mounting surface, such as a surface on a watercraft on which a bimini top is installed. The body 12 further includes a first side plate 18 and an opposing second side plate 20 secured to the base plate 14 and extending upwardly therefrom. The body 12 may further include additional panels for concealing and protecting components of the hinge assembly 10 as described in greater detail below.

With further reference to FIG. 1, the hinge assembly 10 includes a front bimini arm 22 pivotally attached to the body 12 for pivoting between first and second positions. The front bimini arm 22 is preferably pivotally attached to the body 12 with a front bimini arm pivot pin 23. The front bimini arm pivot pin 23 is preferably supported between the first side plate 18 and the second side plate 20, such as by inserting the front bimini arm pivot pin 23 through apertures formed through the first side plate 18 and second side plate 20. The hinge assembly 10 further includes a rear bimini arm 24 pivotally attached to the body 12 with a rear bimini arm pivot pin 25. The rear bimini arm pivot pin 25 is also preferably supported between the first side plate 18 and the second side plate 20, such as by inserting the rear bimini arm pivot pin 25 through apertures formed through the first side plate 18 and the second side plate 20.

While reference herein is made to the front bimini arm 22 and rear bimini arm 24, it is understood that the described arrangement of "front" and "rear" may be altered such that the front bimini arm 22 is located towards a rear portion of a watercraft and such that the rear bimini arm 24 is located towards a front portion of the watercraft. Although the terms "front" and "rear" may be used to indicate preferable locations or orientations of components of the hinge assembly 10, such terms are not intended to be limiting with respect to those orientations.

Figure 2:
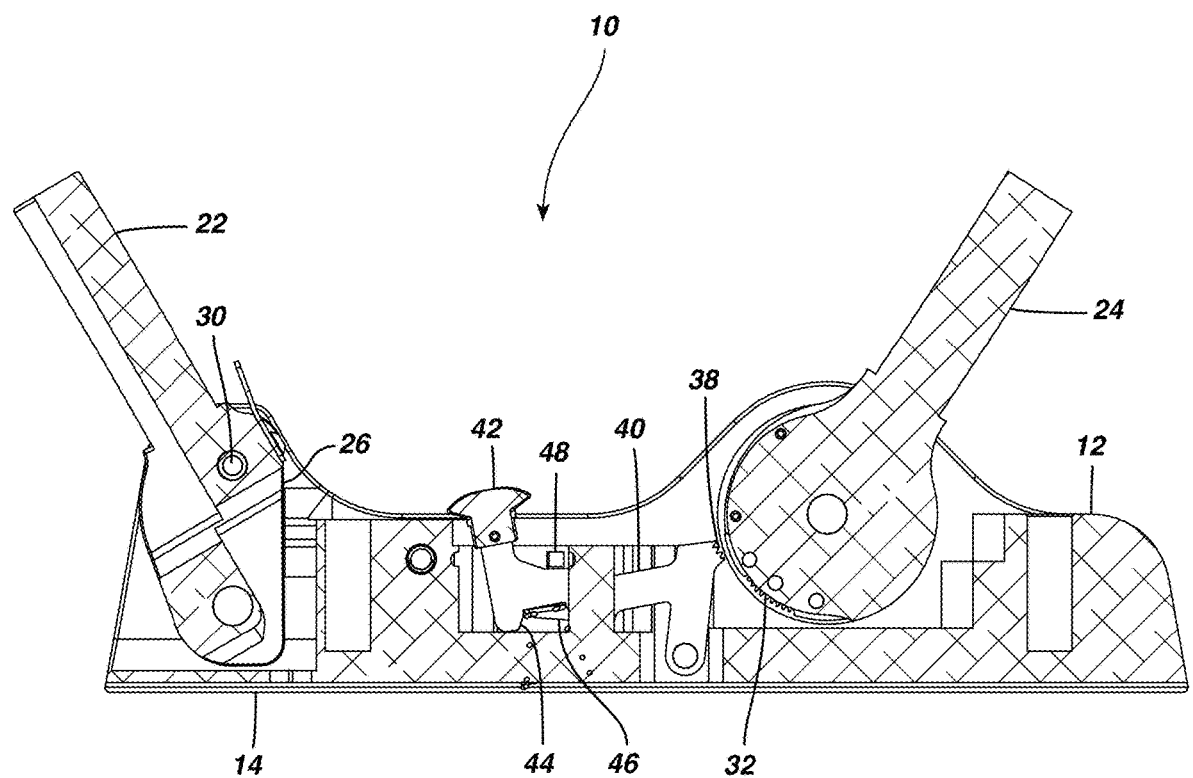
FIG. 2 shows a cross-sectional side view of a hinge assembly according to one embodiment of the present disclosure.

Referring now to FIG. 2, the front bimini arm 22 is pivotable between a folded position and a deployed position. In a deployed position, the front bimini arm 22 is substantially upright relative to a surface on which the hinge assembly 10 is mounted, as shown in FIG. 2. In the deployed position, at least a portion of the front bimini arm 22 may contact a stop 26 on the body 12 to prevent further pivoting of the front bimini arm 22. The front bimini arm 22 is secured in the deployed position such as by inserting a front pivot locking pin 28 (FIG. 3) through an aperture 30 formed through the front bimini arm 22 and the first side plate 18 and second side plate 20 of the body 12.

The rear bimini arm 24 is pivotable between a folded position and a deployed position, such as by pivoting the rear bimini arm 24 around the rear bimini arm pivot pin 25.

The rear bimini arm 24 includes a plurality of teeth 32 formed thereon for ratcheting of the rear bimini arm 25 as described in greater detail below. The plurality of teeth 32 are preferably formed around at least a portion of a circular base of the rear bimini arm 24, as shown in FIG. 2, such that the plurality of teeth 32 form a round gear on the rear bimini arm 24. However, it is also understood that the plurality of teeth 32 may be formed on other suitable portions of the rear bimini arm 24 such that the rear bimini arm 24 is capable of ratcheting relative to the body 12 as described in greater detail below.

A pawl 34 is located on the body 12 proximate to the rear bimini arm 24 for releasably engaging the plurality of teeth 32 formed on the rear bimini arm 24. As shown in FIG. 1, the pawl 34 is preferably pivotally attached to the body 12 with a pawl pivot pin 36. The pawl pivot pin 36 is inserted through the body 12 and an aperture formed in the pawl 34 to enable the pawl 34 to pivot with respect to the body 12. While the pawl 34 is preferably pivotally attached to the body 12, it is also understood that the pawl 34 may be secured to the body 12 in movable relation to the rear bimini arm 24, such as by being slidably mounted to the body 12. The pawl 34 preferably includes a plurality of teeth 38 formed on an end thereof for engaging the plurality of teeth 32 of the rear bimini arm 24.

The pawl 34 includes a lever 40 extending from an end of the pawl 34 adjacent the plurality of teeth 38 to an end that is distal from the plurality of teeth 38 of the pawl 34. A pawl button 42 is located on the distal end of the lever 40 and extends from the body 12 such that a user may engage the pawl 34 by contacting the pawl button 42. A pawl stop 44 is preferably located on a lower portion of the lever 40 of the pawl 34 for contacting a portion of the body 12 to prevent further movement of the pawl 34. A pawl spring 46 is located between the body 12 and the pawl 34 for biasing the pawl 34 towards engagement with the plurality of teeth 32 of the rear bimini arm 24. The pawl spring 46 is preferably located between the body 12 and a bottom side of the lever 40 such that the pawl spring 46 is in compression for urging the lever 40 upwards relative to the body 12. However, it is also understood that the pawl spring 46 may be located in other suitable locations for biasing the pawl 34, such as by locating the pawl spring 46 above the lever 40 or by using a torsion spring located at the pawl pivot pin 36.

The hinge assembly 10 further includes a pawl lock 48 located adjacent to the pawl 34 for securing the pawl 34 in one of an engaged or disengaged relationship to the plurality of teeth 32 of the rear bimini arm 24. As shown in FIG. 2, the pawl lock 48 preferably contacts a portion of the pawl 34 for securing the pawl 34 in a disengaged position such that the rear bimini arm 24 is allowed to freely pivot with respect to the body 12. The pawl lock 48 is preferably oriented such that the pawl lock 48 pivots about an axis that is perpendicular to a pivot axis of the pawl 34. The pawl lock 48 includes an elongate lock arm 50 that is pivotally mounted to the body 12 at a pawl lock pivot pin 52. The elongate lock arm 50 is preferably mounted to the pawl lock pivot pin 52 proximate to a midpoint of the elongate lock arm 50.

The pawl lock 48 includes a projection 54 extending from an end of the elongate lock arm 50 for contacting at least a portion of the pawl 34 to secure the pawl 34 in a disengaged position. The projection 54 is preferably shaped to contact the lever 40 of the pawl 34 when the pawl button 42 is depressed and when the plurality of teeth 38 of the pawl 34 are disengaged from the plurality of teeth 32 of the rear bimini arm 24. The pawl lock 48 further includes a lock button 56 located on the elongate lock arm 50 and extending from a side of the body 12 for engagement of the pawl lock 48 by a user. The pawl lock 48 further preferably includes a pawl lock spring 58 located between the pawl lock 48 and the body 12 for biasing the pawl lock 48 towards the pawl 34.

Figure 8:
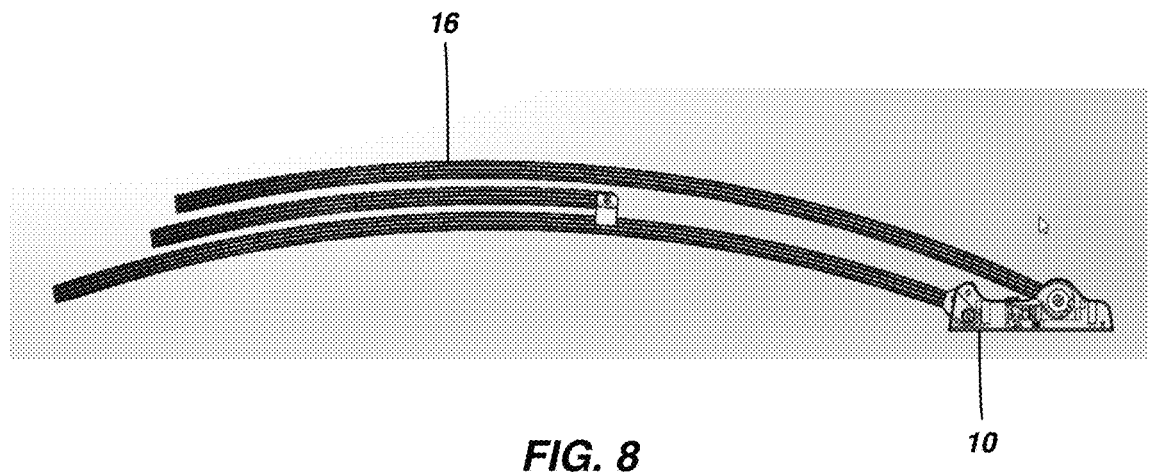
FIG. 8 shows a side view of a bimini hinge and bimini frame in a collapsed position according to one embodiment of the present disclosure.
Figure 9:
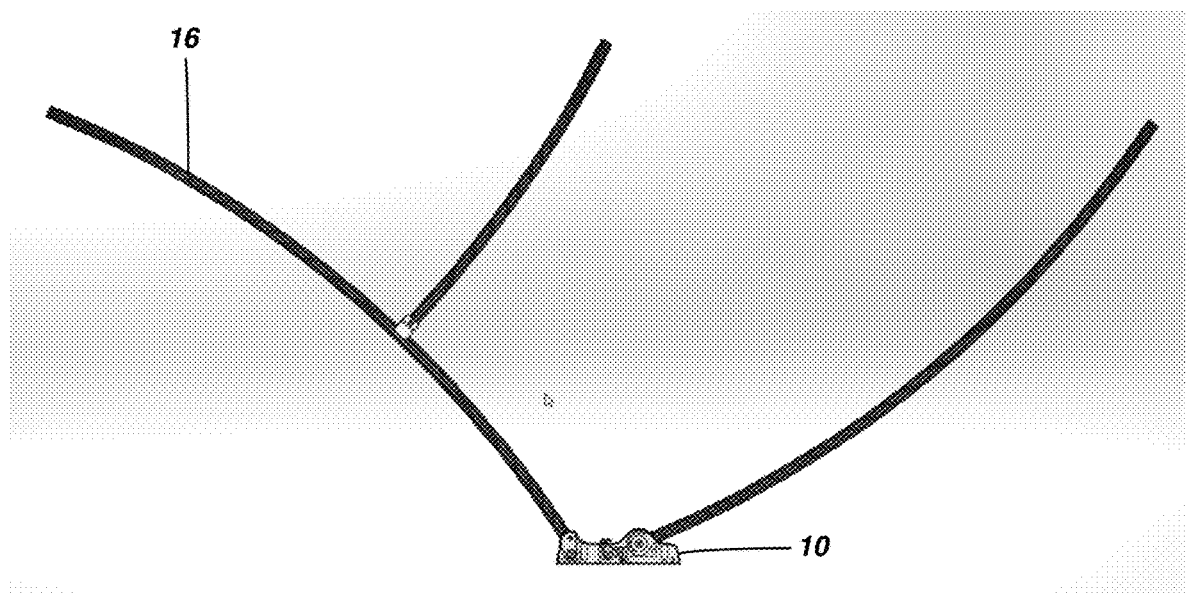
FIG. 9 shows a side view of a bimini hinge and bimini frame in a deployed position according to one embodiment of the present disclosure.

The front bimini arm 22 and rear bimini arm 24 are pivotally coupled with the body 12 and are shaped such that a bimini frame 60 is attached to the front bimini arm 22 and rear bimini arm 24, as shown in FIGS. 8 and 9. In a stowed position (FIG. 8), the bimini frame 60 is substantially collapsed such that the bimini is not deployed to cover a watercraft on which the bimini is installed. In the collapsed position, the front bimini arm 22 and rear bimini arm 24 are pivoted towards a front of the hinge assembly 10.

To deploy the bimini frame 60, the lock button 56 is depressed, thereby disengaging the projection 54 from the elongate lock arm 50. When the projection is disengaged, the pawl spring 46 urges the pawl 34 into contact with the rear bimini arm 24. The bimini frame 60 is pulled towards a deployed position, as shown in FIG. 9. When the bimini frame 60 is fully deployed, the plurality of teeth 32 of the rear bimini arm 24 contact the plurality of teeth 38 of the pawl 34 such that the teeth mesh and the rear bimini arm 24 is prevented from rotating to the collapsed position. The rear bimini arm 24 may continue to be rotated until the bimini frame 60 is tightly deployed. When deployed, the plurality of teeth 38 of the pawl 34 are meshed with the plurality of teeth of the rear bimini arm 24 to prevent the bimini frame 60 from returning to the collapsed position. Teeth of the pawl 34 and/or the rear bimini arm 24 are preferably directional in shape such that the rear bimini arm 24 is allowed to move towards the deployed position while being prevented from moving back towards the collapsed position with the pawl 24 is engaged with the rear bimini arm 24.

The front bimini arm 22 is similarly rotated from the stowed or collapsed position to a deployed position. The front bimini arm 22 is preferably rotated until a portion of the front bimini arm 22 contacts the stop 26 of the body 12, which prevents further rotation or movement of the front bimini arm 22. When the front bimini arm 22 is rotated such that a portion of the front bimini arm 22 contacts the stop 26, the aperture 30 formed through the front bimini arm 22 is preferably in alignment with such that the front pivot locking pin 28 is insertable through the front bimini arm 22, thereby preventing the front bimini arm 22 from returning to the collapsed or stowed position. When secured with the front pivot locking pin 28, the front bimini arm 22 is substantially locked into position relative to the rear bimini arm 24. The bimini frame 60 may be further tightened such as by additional movement of the rear bimini arm 24 relative to the front bimini arm 22, wherein the engagement of the pawl 24 with the rear bimini arm 24 allows movement of the rear bimini arm 24 towards the deployed position.

During deployment of the bimini frame 60, a user may first deploy the front bimini arm 22 and subsequently deploy the rear bimini arm. Alternatively, the user may pull both the front bimini arm 22 and rear bimini arm 24 such that the front bimini arm 22 and rear bimini arm 24 are simultaneously moved from collapsed positions to deployed positions.

To collapse the bimini frame 60 mounted on the hinge assembly 10, the user depresses the pawl button 42, thereby pivoting the pawl 34 around the pawl pivot pin 36 such that the plurality of teeth 38 of the pawl 34 are disengaged from the plurality of teeth 32 of the rear bimini arm 24. When the pawl button 42 is depressed, the pawl 34 pivots until the pawl stop 44 contacts the body 12. When the pawl stop 44 contacts the body 12, the projection 54 of the elongate lock arm 50 engages the pawl 34 to secure the pawl 34 in the disengaged position such that the rear bimini arm 24 is allowed to move relative to the pawl 34.

The hinge assembly 10 preferably installed proximate to sides of a watercraft such that a bimini top is supported by a pair of the hinge assemblies 10. The pair of hinge assemblies may support the bimini top such that a user manipulates one or both of the hinge assemblies to deploy and collapse the bimini top mounted on the hinge assemblies. While the hinge assembly preferably supports a bimini top, such as on a watercraft, the hinge assembly 10 may otherwise be suitable for supporting various other structures.

Embodiments of the hinge assembly 10 described herein advantageously enable the deployment and collapsing of a structure, such as a bimini top. The hinge assembly 10 allows a single user to easily lock a bimini top in a deployed position. Further, the hinge assembly allows for a user to manipulate the bimini top between deployed and collapsed positions without requiring additional assistance. The hinge assembly allows the bimini top to be tightly deployed without requiring substantial adjustment to the hinge assembly or a frame supporting the bimini top.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A hinge assembly comprising:
   a body;
   a first arm pivotally mounted on the body and movable between a first position and a second position, the first arm including a plurality of teeth formed thereon;
   a pawl mounted on the body proximate to a portion of the first arm, the pawl shaped to releasably engage the plurality of teeth of the first arm;
   a pawl button;
   wherein in a collapsed position of the hinge assembly the pawl is disengaged from the plurality of teeth of the first arm such that the first arm is pivotable relative to the pawl;
   wherein the pawl is disengaged from the first arm by manipulating the pawl button; and
   wherein in a deployed position the pawl engages the plurality of teeth of the first arm to releasably secure the first arm in the second position.

2. The hinge assembly of claim 1, further comprising a second arm pivotally mounted on the body and movable between a first position and a second position.

3. The hinge assembly of claim 2, the second arm further including an aperture formed therethrough, wherein when the second arm is in the second position the aperture is in alignment with apertures formed through the body.

4. The hinge assembly of claim 3, further comprising a second arm locking pin insertable through the housing and the aperture of the second arm to secure the second arm in the second position.

5. The hinge assembly of claim 1, further comprising a bimini frame mounted on the hinge assembly and movable between deployed and collapsed positions on the hinge assembly.

6. The hinge assembly of claim 1, the pawl further comprising a pawl spring located between the pawl and the body for biasing the pawl towards the first arm.

7. The hinge assembly of claim 1, further comprising a pawl lock movably mounted on the housing proximate to the pawl, wherein the pawl lock secures the pawl in a disengaged position relative to the first arm.

8. The hinge assembly of claim 7, further comprising a pawl lock spring for biasing the pawl lock towards the pawl for securing the pawl in the disengaged position.

9. A bimini top hinge assembly for supporting a bimini top in deployed and collapsed positions, the bimini top hinge assembly comprising:
   a body;
   a first bimini arm pivotally mounted on the body and movable between a first position and a second position, the first arm including a plurality of teeth formed thereon;
   a second bimini arm pivotally mounted on the body and movable between a first position and a second position;
   a pawl pivotally mounted on the body proximate to a portion of the first bimini arm, the pawl shaped to releasably engage the plurality of teeth of the first bimini arm;
   wherein in a collapsed position of the hinge assembly the pawl is disengaged from the plurality of teeth of the first bimini arm such that the first bimini arm is pivotable relative to the pawl; and
   wherein in a deployed position the pawl engages the plurality of teeth of the first bimini arm to releasably secure the first arm in the second position.

10. The bimini top hinge assembly of claim 9, the second bimini arm further including an aperture formed therethrough, wherein when the second bimini arm is in the second position the aperture is in alignment with apertures formed through the body.

11. The bimini top hinge assembly of claim 10, further comprising a second bimini arm locking pin insertable through the housing and the aperture of the second bimini arm to secure the second bimini arm in the second position.

12. The bimini top hinge assembly of claim 9, further comprising a bimini frame mounted on the hinge assembly and movable between deployed and collapsed positions on the hinge assembly.

13. The bimini top hinge assembly of claim 9, the pawl further comprising a pawl spring located between the pawl and the body for biasing the pawl towards the first arm.

14. The bimini top hinge assembly of claim 9, the pawl further comprising a pawl button, wherein a user disengages the pawl from the first arm by manipulating the pawl button.

15. The bimini top hinge assembly of claim 9, further comprising a pawl lock movably mounted on the housing proximate to the pawl, wherein the pawl lock secures the pawl in a disengaged position relative to the first bimini arm.

16. The bimini top hinge assembly of claim 15, further comprising a pawl lock spring for biasing the pawl lock towards the pawl for securing the pawl in the disengaged position.

17. A bimini top hinge assembly for supporting a bimini top in deployed and collapsed positions, the bimini top hinge assembly comprising:
- a body;
- a first bimini arm pivotally mounted on the body and movable between a first position and a second position, the first arm including a plurality of teeth formed thereon;
- a second bimini arm pivotally mounted on the body and movable between a first position and a second position;
- a pawl pivotally mounted on the body proximate to a portion of the first arm, the pawl shaped to releasably engage the plurality of teeth of the first arm;
- a pawl lock movably mounted on the housing proximate to the pawl, wherein the pawl lock secures the pawl in a disengaged position relative to the first arm;
- wherein in a collapsed position of the hinge assembly the pawl is disengaged from the plurality of teeth of the first arm such that the first arm is pivotable relative to the pawl; and
- wherein in a deployed position the pawl engages the plurality of teeth of the first arm to releasably secure the first arm in the second position.

18. The bimini top hinge assembly of claim 17, further comprising a pawl lock spring for biasing the pawl lock towards the pawl for securing the pawl in the disengaged position.

19. The bimini top hinge assembly of claim 17, further comprising a bimini frame mounted on the hinge assembly and movable between deployed and collapsed positions on the hinge assembly.

\* \* \* \* \*